United States Patent Office 2,729,573
Patented Jan. 3, 1956

2,729,573
PLASTIC WELDING COMPOSITION

Bernard B. Goldner, Philadelphia, and John C. MacIntyre, Lansdale, Pa.

No Drawing. Application May 18, 1953,
Serial No. 355,872

2 Claims. (Cl. 106—287)

Our invention relates to a composition which welds two members together and is especially applicable to repairing broken plastic toys and plastic kitchen ware.

The composition also is readily used for assembling plastic models and is an adhesive to hold two or more parts together.

It is, therefore, an object of our invention to provide a composition which will weld plastics.

Another object of our invention is to provide a composition for uniting plastics wherein two or more parts may be united together and where the united plastic can be as strong as it was before it was broken.

Another object of our invention is to provide a liquid composition for welding solid plastic materials together which will not deteriorate and which may be readily used in a liquid state.

Another object of our invention is to provide a liquid composition for joining solid plastic members together which will hold the parts together without the necessity of any external part.

Other objects of our invention are to provide a composition of the character described which is economical to manufacture and which may be readily retained and preserved when not in use. The following is an example of the utilization and composition of our invention:

Ethylene dichloride ($ClCH_2CH_2Cl$)
Tetrahydrofurfuryl alcohol ($C_4H_7O.CH_2OH$)

The liquid compound is made by physically mixing nine parts of ethylene dichloride, known as E. D. with 1 part of tetrahydrofurfuryl alcohol, known as THFA.

The E. D. alone is a plastic solvent and is used as such. The THFA is also a solvent, but particularly for other plastics in the thermoplastic family and on which the E. D. is not effective.

This compound may be used only on thermoplastic types of resins.

Although our invention has been described in considerable detail, such description is intended as being illustrative rather than limiting, since the invention may be variously embodied, and the scope of the invention is to be determined as claimed.

We claim as our invention:

1. A composition of matter used as a plastic weld consisting of a mixture of ethylene dichloride and tetrahydrofurfuryl alcohol.

2. A liquid composition used as a plastic weld consisting of a compatible mixture of nine parts of ethylene dichloride, and one part of tetrahydrofurfuryl alcohol.

References Cited in the file of this patent

UNITED STATES PATENTS

| 1,703,697 | Trickey | Feb. 29, 1929 |
| 2,173,755 | Fuller | Sept. 19, 1939 |

FOREIGN PATENTS

| 68,916 | Austria | June 10, 1915 |

OTHER REFERENCES

Simonds et al.: "Handbook of Plastics" (1943), pages 244–247.